United States Patent
Joo et al.

(10) Patent No.: US 11,035,273 B2
(45) Date of Patent: Jun. 15, 2021

(54) AFTER TREATMENT SYSTEM AND AFTER TREATMENT METHOD FOR LEAN-BURN ENGINE

(71) Applicants: Hyundai Motor Company, Seoul (KR); KIA Motors Corporation, Seoul (KR)

(72) Inventors: Nahm Roh Joo, Gyeonggi-do (KR); ChangHo Jung, Gyeonggi-do (KR); Chang Hwan Kim, Gyeonggi-do (KR); Dohyung Kim, Gyeongsangbuk-do (KR)

(73) Assignees: HYUNDAI MOTOR COMPANY, Seoul (KR); KIA MOTORS COMPANY, Seoul (KR)

( * ) Notice: Subject to any disclaimer, the term of this patent is extended or adjusted under 35 U.S.C. 154(b) by 142 days.

(21) Appl. No.: 16/263,633

(22) Filed: Jan. 31, 2019

(65) Prior Publication Data
US 2020/0248605 A1   Aug. 6, 2020

(51) Int. Cl.
  *F01N 3/20* (2006.01)
  *F01N 3/10* (2006.01)
  *B01D 53/94* (2006.01)

(52) U.S. Cl.
  CPC .......... *F01N 3/2053* (2013.01); *F01N 3/101* (2013.01); *F01N 3/103* (2013.01); *F01N 3/208* (2013.01); *F01N 3/2073* (2013.01); *B01D 53/9418* (2013.01); *B01D 53/9477* (2013.01); *B01D 53/9495* (2013.01); *B01D 2255/40* (2013.01); *B01D 2255/908* (2013.01); *B01D 2258/012* (2013.01); *F01N 2410/02* (2013.01); *F01N 2610/02* (2013.01); *F01N 2900/1402* (2013.01); *F01N 2900/1622* (2013.01); *F01N 2900/1626* (2013.01)

(58) Field of Classification Search
CPC .. F01N 3/2066; F01N 13/009; F01N 2410/00; F01N 2430/06; F01N 2610/02; F01N 3/0814; F01N 2570/10; F01N 2610/03; F01N 2900/1402; F01N 3/0821; F01N 3/101; F01N 3/103; F01N 3/208; B01D 53/9418; B01D 53/9477; B01D 2251/2062; B01D 53/9422; B01D 53/9445; Y02A 50/2325; Y02A 50/234; Y02A 50/2341
See application file for complete search history.

(56) References Cited

U.S. PATENT DOCUMENTS

2007/0065354 A1* 3/2007 Hemingway ........ B01J 19/2485
                                                                  423/235
2010/0043402 A1   2/2010 Perry et al.
(Continued)

*Primary Examiner* — Anthony Ayala Delgado
(74) *Attorney, Agent, or Firm* — Brinks Gilson & Lione

(57) ABSTRACT

An after treatment system for a lean-burn engine is disclosed. The after treatment system is sequentially equipped with an ammonia production catalyst module, a selective catalytic reduction (SCR) catalyst, and a CO clean-up catalyst (CUC) on an exhaust pipe through which an exhaust gas flows and which is connected to a lean-burn engine. An exhaust flow changer is disposed between the ammonia production catalyst module and the SCR catalyst. The exhaust flow changer changes flow of an exhaust gas discharged from the ammonia production catalyst module according to a temperature of the SCR catalyst.

20 Claims, 16 Drawing Sheets

(56) References Cited

U.S. PATENT DOCUMENTS

| | | |
|---|---|---|
| 2010/0139248 A1 | 6/2010 | Najt et al. |
| 2010/0212295 A1 | 8/2010 | Narayanaswamy et al. |
| 2010/0326052 A1 | 12/2010 | Sun |
| 2011/0202253 A1 | 8/2011 | Perry et al. |
| 2011/0288750 A1 | 11/2011 | Wermuth et al. |
| 2012/0060472 A1 | 3/2012 | Li et al. |
| 2013/0186067 A1* | 7/2013 | Dahl ................ F01N 3/208 60/274 |

\* cited by examiner

AFTER TREATMENT SYSTEM AND AFTER TREATMENT METHOD FOR LEAN-BURN ENGINE

FIELD

The present disclosure relates to an after treatment system and an after treatment method for a lean-burn engine. disclosure

BACKGROUND

The statements in this section merely provide background information related to the present disclosure and may not constitute prior art.

Vehicles may be provided with at least one catalytic converter for reducing emission (EM) contained in an exhaust gas. The exhaust gas flowing out from an engine through an exhaust manifold is driven into a catalytic converter mounted at an exhaust pipe and is purified therein. After that, noise of the exhaust gas is decreased while passing through a muffler and then the exhaust gas is emitted into the air through a tail pipe. The catalytic converter purifies the EM contained in the exhaust gas. In addition, a particulate filter for trapping particulate matter (PM) in the exhaust gas is mounted in the exhaust pipe.

A three-way catalyst (TWC) is one type of the catalytic converter and reacts with hydrocarbon (HC) compounds, carbon monoxide (CO) and nitrogen oxides (NOx), which are harmful components of the exhaust gas, to remove these compounds. The TWCs are mainly installed in gasoline vehicles, and Pt/Rh, Pd/Rh or Pt/Pd/Rh systems are used as the TWCs.

A lean-burn engine among gasoline engines improves fuel efficiency by burning a lean air/fuel mixture. The lean-burn engine burns the lean air/fuel mixture, so air/fuel ratio (AFR) of the exhaust gas is also lean. However, when the AFR is lean, the TWC slips the NOx without sufficiently reducing the NOx contained in the exhaust gas. Accordingly, a vehicle equipped with the lean-burn engine may include a selective catalytic reduction (SCR) catalyst for purifying the NOx slipped from the TWC. The SCR catalyst used in the vehicle equipped with the lean-burn engine may be a passive type SCR catalyst.

When the AFR is rich, the TWC may reduce the NOx to produce NH3 and the NH3 generated in the TWC is stored in the passive type SCR catalyst. When the AFR is lean, the passive type SCR catalyst purifies the NOx contained in the exhaust gas using the stored $NH_3$.

Even in the vehicles equipped with the lean burn engine, the engine is operated at a stoichiometric AFR under high-speed/high-load conditions. When the engine is operated at the stoichiometric AFR under the high-speed/high-load conditions, a temperature of the TWC disposed close to the engine may rise to 1,000° C. and a temperature of the SCR catalyst may rise to 700° C. As the temperature of the SCR catalyst rises, the ammonia storage capacity of the SCR catalyst decreases. For example, if the temperature of the SCR catalyst is above 500° C., the SCR catalyst rarely stores the $NH_3$. Therefore, if the temperature of the SCR catalyst rises to 400° C. or higher, the $NH_3$ stored in the SCR catalyst slips. Even if load of the engine is reduced in this state, the NOx contained in the exhaust gas cannot be purified, so that it is difficult to enter a lean AFR.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an after treatment system and an after treatment method for a lean-burn engine having advantages of sending an exhaust gas to a selective catalytic reduction (SCR) catalyst or bypassing the SCR catalyst according to a temperature of the SCR catalyst.

Another aspect of the present disclosure provides an after treatment system and an after treatment method for a lean-burn engine having further advantages of reducing $NH_3$ amount slipped from the SCR catalyst by preventing or inhibiting a temperature rise of the SCR catalyst above a predetermined temperature.

An after treatment system for a lean-burn engine according to an aspect of the present disclosure may include: an exhaust pipe connected to the lean-burn engine and through which an exhaust gas generated in the lean-burn engine flows; an ammonia production catalyst module mounted on the exhaust pipe, capable of purifying emission contained in the exhaust gas, and generating ammonia ($NH_3$) using nitrogen oxide (NOx) contained in the exhaust gas or the NOx stored therein at a rich air/fuel ratio (AFR); a selective catalytic reduction (SCR) catalyst mounted on the exhaust pipe downstream of the ammonia production catalyst module, storing the $NH_3$ generated in the ammonia production catalyst module, and reducing the NOx contained in the exhaust gas using the stored $NH_3$; a CO clean-up catalyst (CUC) mounted on the exhaust pipe downstream of the SCR catalyst and purifying CO contained in the exhaust gas; and an exhaust flow changer mounted on the exhaust pipe between the ammonia production catalyst module and the SCR catalyst, and controlling a flow of the exhaust gas such that the exhaust gas passing through the ammonia production catalyst module flows to one of the SCR catalyst and the CUC, wherein the exhaust gas passing through the SCR catalyst is continuously supplied to the CUC.

The after treatment system may further include a controller detecting information on the AFR of the exhaust gas, a temperature of the SCR catalyst, and a temperature of the CUC, and controlling the AFR of the exhaust gas and operation of the exhaust flow changer based on the information on the AFR of the exhaust gas, the temperature of the SCR catalyst, and the temperature of the CUC.

The operation of the exhaust flow changer may include a normal mode at which the exhaust gas passing through the ammonia production catalyst module flows to the SCR catalyst, and a bypass mode at which the exhaust gas passing through the ammonia production catalyst module flows to the CUC.

The controller may operate the exhaust flow changer at the bypass mode if the temperature of the SCR catalyst is higher than or equal to a first predetermined temperature in a state that the exhaust flow changer is operated at the normal mode and the engine is operated at a stoichiometric AFR.

The controller may operate the exhaust flow changer at the normal mode if the temperature of the SCR catalyst is lower than a second predetermined temperature in a state that the exhaust flow changer is operated at the bypass mode and the engine is operated at the stoichiometric AFR, wherein the second predetermined temperature is lower than or equal to the first predetermined temperature.

The controller may calculate a rich duration and a target rich AFR and operate the engine at the target rich AFR for the rich duration if $NH_3$ generation is necessary or desired in a state that the engine is operated at a lean AFR and the exhaust flow changer is operated at the normal mode.

The controller may operate the engine at the stoichiometric AFR and operate the exhaust flow changer at the bypass mode until the temperature of the CUC is higher than or equal to a third predetermined temperature if the $NH_3$ generation is desired in a state that the engine is operated at the lean AFR and the exhaust flow changer is operated at the normal mode.

The controller may convert the operation of the exhaust flow changer to the normal mode, calculate a rich duration and a target rich AFR, and operate the engine at the target rich AFR for the rich duration if $NH_3$ generation is desired in a state that the engine is operated at a stoichiometric AFR and the exhaust flow changer is operated at the bypass mode.

The controller may operate the engine at the stoichiometric AFR until the temperature of the SCR catalyst is lower than the second predetermined temperature if the $NH_3$ generation is desired in a state that the engine is operated at the stoichiometric AFR and the exhaust flow changer is operated at the bypass mode.

The ammonia production catalyst module may include at least one of a three-way catalyst (TWC), an ammonia production catalyst (APC), an additional TWC, and a lean NOx trap catalyst.

The ammonia production catalyst module may further include a particulate filter trapping particulate matter in the exhaust gas.

An after treatment method according to another aspect of the present disclosure is configured to control an after treatment system sequentially equipped with an ammonia production catalyst module, a selective catalytic reduction (SCR) catalyst, and a CO clean-up catalyst (CUC) on an exhaust pipe through which an exhaust gas flows and which is connected to a lean-burn engine.

The after treatment system may further include an exhaust flow changer disposed between the ammonia production catalyst module and the SCR catalyst and controlling a flow of the exhaust gas such that the exhaust gas passing through the ammonia production catalyst module flows to one of the SCR catalyst and the CUC.

The exhaust gas passing through the SCR catalyst may be continuously supplied to the CUC.

Operation of the exhaust flow changer may include a normal mode at which the exhaust gas passing through the ammonia production catalyst module flows to the SCR catalyst, and a bypass mode at which the exhaust gas passing through the ammonia production catalyst module flows to the CUC.

The after treatment method may include: determining whether a temperature of the SCR catalyst is higher than or equal to a first predetermined temperature during operating the engine at a stoichiometric AFR; and converting the operation of the exhaust flow changer into the bypass mode if the temperature of the SCR catalyst is higher than or equal to the first predetermined temperature.

The after treatment method may further include: determining whether the temperature of the SCR catalyst is lower than a second predetermined temperature during the engine is operated at the stoichiometric AFR and the exhaust flow changer is operated at the bypass mode; and converting the operation of the exhaust flow changer into the normal mode if the temperature of the SCR catalyst is lower than the second predetermined temperature, wherein the second predetermined temperature is lower than or equal to the first predetermined temperature.

The after treatment method may further include: determining whether $NH_3$ generation is desired during the engine is operated at a lean AFR and the exhaust flow changer is operated at the normal mode; calculating a rich duration and a target rich AFR if the $NH_3$ generation is desired; and operating the engine at the target rich AFR for the rich duration.

The after treatment method may further include: determining, before calculating the rich duration and the target rich AFR, whether a temperature of the CUC is lower than a third predetermined temperature; operating the engine at the stoichiometric AFR if the temperature of the CUC is lower than the third predetermined temperature; and converting the operation of the exhaust flow changer into the bypass mode.

The after treatment method may further include maintaining or converting the operation of the exhaust flow changer into the normal mode if the temperature of the CUC is higher than or equal to the third predetermined temperature.

The after treatment method may further include: determining whether $NH_3$ generation is desired during the engine is operated at the stoichiometric AFR and the exhaust flow changer is operated at the bypass mode; determining whether the temperature of the SCR catalyst is lower than a second predetermined temperature if the $NH_3$ generation is desired; converting the operation of the exhaust flow changer into the normal mode if the temperature of the SCR catalyst is lower than the second predetermined temperature; calculating a rich duration and a target rich AFR; and operating the engine at the target rich AFR for the rich duration.

The after treatment method may further include operating the engine continuously at the stoichiometric AFR if the temperature of the SCR catalyst is higher than or equal to the second predetermined temperature.

Operating the engine at a lean AFR may be prohibited if the exhaust flow changer is operated at the bypass mode.

The rich duration may be calculated according to the target rich AFR and a temperature of the CUC.

According to aspects of the present disclosure, an exhaust gas is sent to an SCR catalyst or bypasses the SCR catalyst according to a temperature of the SCR catalyst, thereby inhibiting or preventing the temperature of the SCR catalyst from excessively rising. Therefore, $NH_3$ amount slipped from the SCR catalyst may be reduced.

According to aspects of the present disclosure, CO purifying efficiency may be improved by continuously supplying the exhaust gas to a CUC regardless of whether or not the exhaust gas bypasses the SCR catalyst.

In addition, other effects of the aspects of the present disclosure should be directly or implicitly described in the description provided herein. Various effects predicted according to the aspects of the present disclosure will be disclosed in the description provided herein.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

The disclosure may be better understood by referring to the following description in conjunction with the accompanying drawings in which like reference numerals indicate identically or functionally similar elements, of which:

Figure 15:
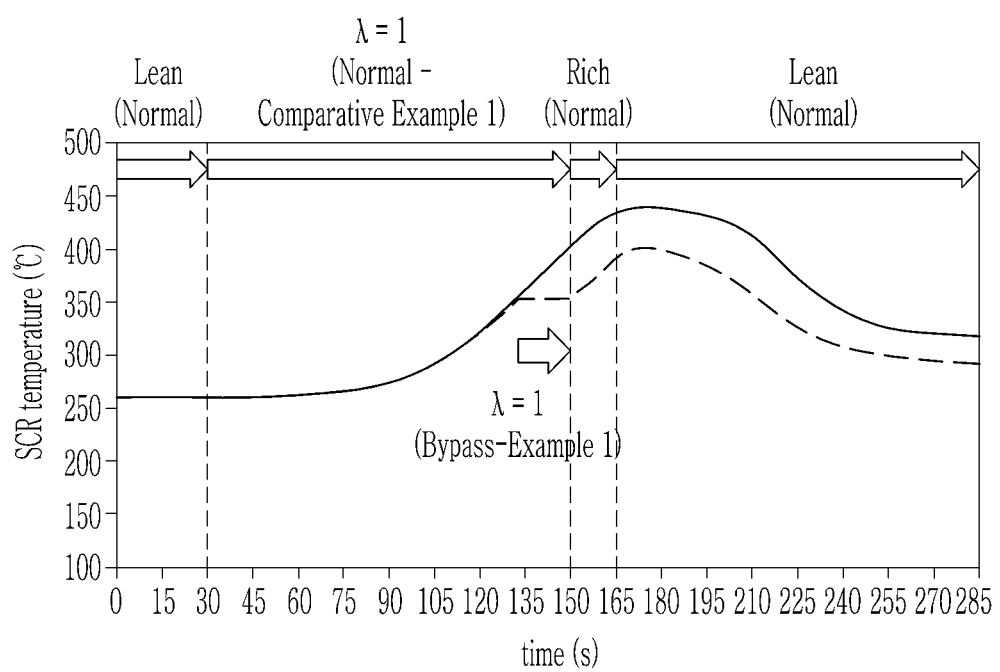
Figure 16:
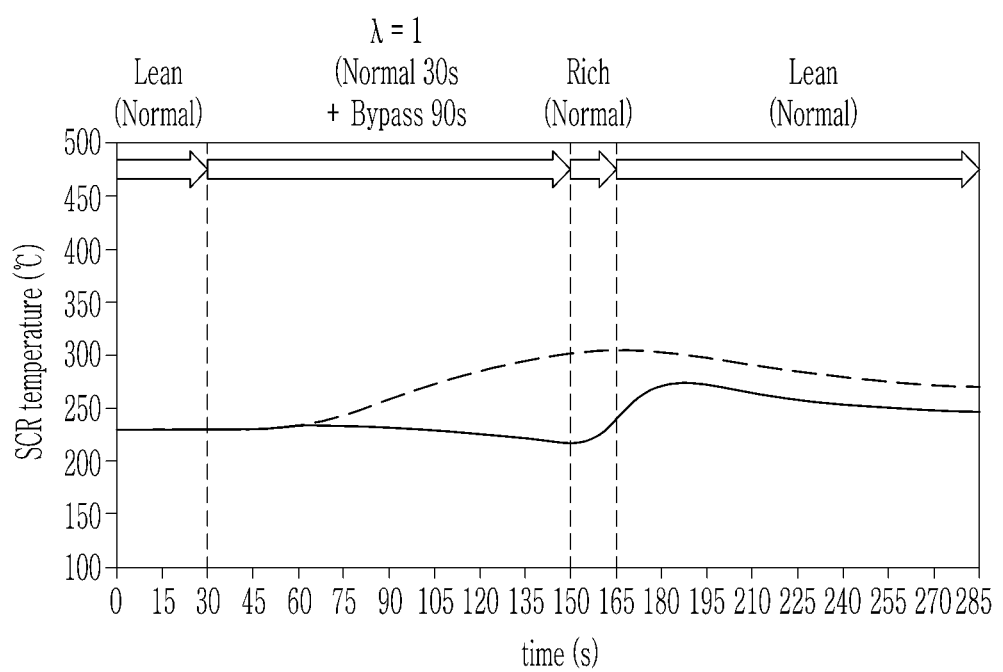

FIG. 15 is a graph showing a temperature of an SCR catalyst if an exhaust gas bypasses the SCR catalyst and if the exhaust gas does not bypass the SCR catalyst when an engine is operated under a predetermined driving condition; and FIG. 16 is a graph showing a temperature of a CUC if an exhaust gas bypasses the CUC and if the exhaust gas does not bypass the CUC when an engine is operated under a predetermined driving condition.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The terminology used herein is for the purpose of describing particular aspects only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle," "vehicular," "car," or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum).

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by a system comprising the controller, as described in detail below.

Furthermore, the controller of the present disclosure may be embodied as non-transitory computer readable media containing executable program instructions executed by a processor or the like. Examples of the computer readable mediums include, but are not limited to, ROM, RAM, compact disc (CD)-ROMs, magnetic tapes, floppy disks, flash drives, smart cards, and optical data storage devices. The computer readable recording medium can also be distributed throughout a computer network so that the program instructions are stored and executed in a distributed fashion, e.g., by a telematics server or a Controller Area Network (CAN).

Hereinafter, aspects of the present disclosure will be described in detail with reference to the accompanying drawings.

Figure 1:
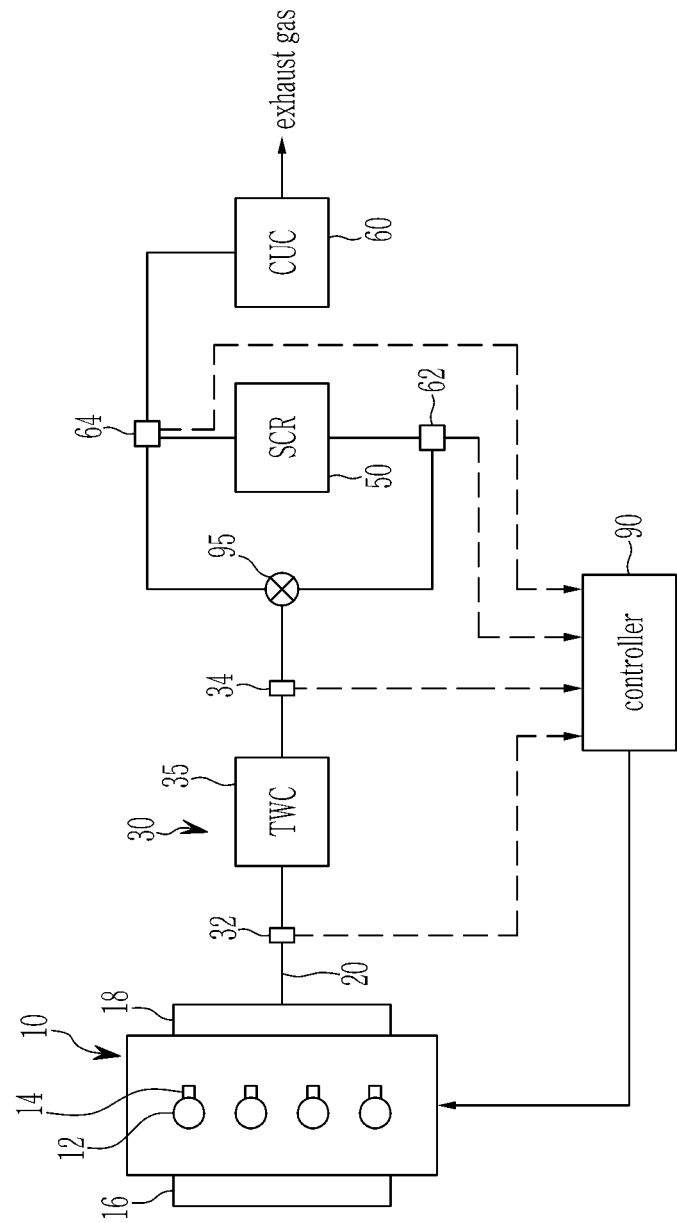
FIG. 1 is a schematic diagram of an after treatment system for a lean-burn engine according to an aspect of the present disclosure.

FIG. 1 is a schematic diagram of an after treatment system for a lean-burn engine according to an aspect of the present disclosure.

As shown in FIG. 1 an after treatment system according to an aspect of the present disclosure includes an engine 10, an exhaust pipe 20, an ammonia production catalyst module 30, an exhaust flow changer 95, a selective catalytic reduction (SCR) catalyst 50, and a CO clean-up catalyst (CUC) 60.

The engine 10 burns an air/fuel mixture to convert chemical energy into mechanical energy. The engine 10 is connected to an intake manifold 16 to flow air into a combustion chamber 12. An exhaust gas generated in combustion process is collected in an exhaust manifold 18 and then flows out from the engine 10. The combustion chamber 12 is equipped with a spark plug 14 to ignite the air/fuel mixture within the combustion chamber 12. The engine 10 may be a gasoline engine. Depending on types of gasoline engines, fuel may be directly injected into the combustion chamber 12 or the air/fuel mixture may be supplied to the combustion chamber 12 via the intake manifold 16. In addition, the engine 10 may be a lean-burn engine. Therefore, the engine 10 operates at a lean air/fuel ratio (AFR) except for special driving conditions.

The exhaust pipe 20 is connected to the exhaust manifold 18 to discharge the exhaust gas to an outside of the vehicle. The exhaust pipe 20 is equipped with the ammonia production catalyst module 30, the SCR catalyst 50, and the CUC 60 to purify or remove emission and particulate matter contained in the exhaust gas.

The ammonia production catalyst module 30 includes a three-way catalyst (TWC) 35. The ammonia production catalyst module 30 can generate $NH_3$ using NOx contained in the exhaust gas or stored in the ammonia production catalyst module 30 at a rich AFR. The ammonia production catalyst module 30 contains an oxygen storage material having oxygen storage capacity (OSC).

The TWC 35 is disposed on the exhaust pipe 20 through which the exhaust gas discharged from the engine 10 flows, and harmful materials including CO, HC, and NOx contained in the exhaust gas are converted into harmless components by an oxidation-reaction reaction in the TWC 35. Particularly, the TWC 35 can reduce the NOx contained in the exhaust gas into $NH_3$ at the rich AFR. At this time, the TWC 35 may not purify the CO and the HC in the exhaust gas sufficiently and may slip the CO and the HC therefrom. In addition, the TWC 35 oxidizes the CO and the HC contained in the exhaust gas at the lean AFR. Generally, the TWC 35 can purify all of the CO, the HC, and the NOx at a stoichiometric AFR. Since the TWC 35 is well known to a person of an ordinary skill in the art, a detailed description thereof will be omitted.

The SCR catalyst 50 is mounted on the exhaust pipe 20 downstream of the ammonia production catalyst module 30. The SCR catalyst 50 stores the $NH_3$ generated in the ammonia production catalyst module 30 at the rich AFR and reduces the NOx contained in the exhaust gas using the stored $NH_3$ at the lean AFR. This type of the SCR catalyst 50 may be referred to as a passive type SCR catalyst 50.

The SCR catalyst 50 may be composed of one or a combination of a zeolite catalyst and a metal catalyst supported in a porous $Al_2O_3$. At least one of Cu, Pt, Mn, Fe, Co, Ni, Zn, Cs and Ga may be ion-exchanged in the zeolite catalyst. In the metal catalyst supported in the porous $Al_2O_3$, at least one metal among Pt, Pd, Rh, Ir, Ru, W, Cr, Mn, Fe, Co, Cu, Zn and Ag may be supported in the porous $Al_2O_3$.

The CUC 60 is mounted on the exhaust pipe 20 downstream of the SCR catalyst 50. The CUC 60 purifies the CO contained in the exhaust gas. Particularly, the CO may be slipped from the ammonia production catalyst module 30 at the rich AFR. Therefore, emission of the CO to the outside of the vehicle can be inhibited or prevented by disposing the CUC 60 at the most downstream of the after treatment system. The CUC 60 includes Pt, Pd, Rh, and Ba supported in $CeO_2$ and $Al_2O_3$.

In one aspect, the CUC 60 includes 0.2-1.5 wt % of Pt, 0-0.4 wt % of Pd, 0-0.4 wt % of Rh, 0-5.0 wt % of Ba, 40-90 wt % of $CeO_2$, 9.8-59.8 wt % of $Al_2O_3$, and 0-10 wt % of an additive based on a total weight of the CUC 60.

In another aspect, the CUC 60 includes 0.2-1.5 wt % of Pt, 0-0.4 wt % of Pd, 0-0.4 wt % of Rh, 0-5.0 wt % of Ba, 40-90 wt % of $CeO_2$, 9.8-59.8 wt % of $Al_2O_3$, and 0-20 wt % of an additive based on a total weight of the CUC 60.

The additive is added for improving performance of the $CeO_2$ and the $Al_2O_3$ and includes at least one of La, Zr, Mg and Pr.

The CUC 60 is mainly composed of Pt—CeO2. Here, the Pt functions to oxidize the CO, and the $CeO_2$ contains an oxygen storage material having OSC to help oxidation of the CO at low temperature at the lean AFR. $Pd/Al_2O_3$ also plays a role similar to the $Pt/CeO_2$, but an amount of the $Pt/CeO_2$ may be greater than that of the $Pd/Al_2O_3$ in order to improve oxidation ability at the low temperature.

The Ba contained in the CUC 60 functions to remove a small amount of the NOx that is not removed from the SCR catalyst 50 when the AFR is rich.

The Rh included in the CUC 60 is intended to promote reduction of the NOx when the AFR is rich.

The exhaust flow changer 95 is mounted on the exhaust pipe 20 between the ammonia production catalyst module 30 and the SCR catalyst 50. The exhaust flow changer 95 controls a flow of the exhaust gas such that the exhaust gas flows into the SCR catalyst 50 or bypasses the SCR catalyst 50 and flows into the CUC 60. Here, operation of the exhaust flow changer 95 includes a normal mode and a bypass mode.

Figure 2:
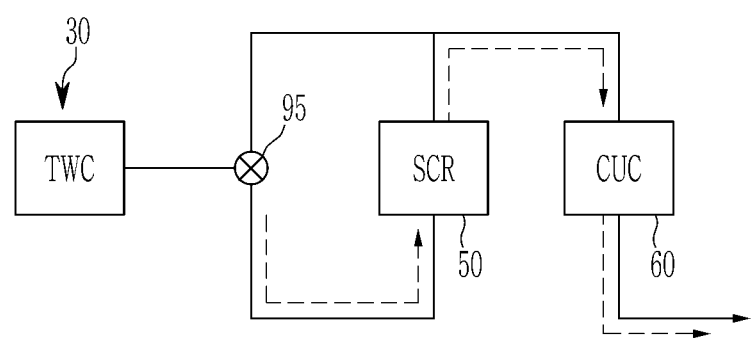
FIG. 2 is a schematic diagram illustrating a flow of an exhaust gas when an exhaust flow changer according to an aspect of the present disclosure is operated at a normal mode.
Figure 3:
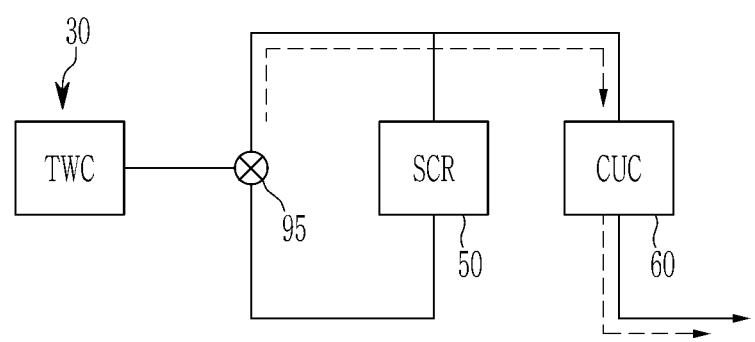
FIG. 3 is a schematic diagram illustrating a flow of an exhaust gas when an exhaust flow changer according to an aspect of the present disclosure is operated at a bypass mode.

FIG. 2 is a schematic diagram illustrating a flow of an exhaust gas when an exhaust flow changer according to an aspect of the present disclosure is operated at a normal mode; and FIG. 3 is a schematic diagram illustrating a flow of an exhaust gas when an exhaust flow changer according to an aspect of the present disclosure is operated at a bypass mode. A dotted line in FIG. 2 and FIG. 3 represents the flow of the exhaust gas passing through the exhaust flow changer 95.

As shown in FIG. 2, if the exhaust flow changer 95 is operated at the normal mode, the exhaust gas passing through the ammonia production catalyst module 30 is supplied to the SCR catalyst 50 and the CUC 60 sequentially. In this case, the exhaust gas supplied to the SCR catalyst 50 is continuously supplied to the CUC 60. Therefore, the NOx contained in the exhaust gas is removed by the SCR catalyst 50, and the CO contained in the exhaust gas is removed by the CUC 60.

As shown in FIG. 3, if the exhaust flow changer 95 is operated at the bypass mode, the exhaust gas passing through the ammonia production catalyst module 30 is not supplied to the SCR catalyst 50 but is directly supplied to the CUC 60. In this case, the NOx contained in the exhaust gas can be discharged to the exterior of the vehicle without being removed. Therefore, if the exhaust flow changer 95 is operated at the bypass mode, the engine 10 cannot be operated at the lean AFR.

In the meantime, the exhaust pipe 20 may be equipped with a plurality of sensors 32, 34, 62, and 64 for detecting the AFR of the exhaust gas and operation of the catalysts 30, 50 and 60.

A first oxygen sensor 32 is mounted on the exhaust pipe 20 at an upstream of the ammonia production catalyst module 30, detects $O_2$ concentration in the exhaust gas at the upstream of the ammonia production catalyst module 30, and transmits a signal corresponding thereto to a controller 90. The AFR (it will hereinafter be referred to as 'A') of the exhaust gas described herein may refer to a value detected by the first oxygen sensor 32. In addition, an AFR control described here may refer to controlling the AFR of the exhaust gas to be a target AFR.

A second oxygen sensor 34 is mounted on the exhaust pipe 20 at the downstream of the ammonia production catalyst module 30, detects $O_2$ concentration in the exhaust gas at the downstream of the ammonia production catalyst module 30, and transmits a signal corresponding thereto to the controller 90.

A first temperature sensor 62 is mounted on the exhaust pipe 20 at an upstream of the SCR catalyst 50, detects a temperature of the exhaust gas at the upstream of the SCR catalyst 50, and transmits a signal corresponding thereto to the controller 90. As shown in FIG. 2, since the exhaust gas passing through the exhaust flow changer 95 is supplied to the SCR catalyst 50 when the exhaust flow changer 95 is operated at the normal mode, the first temperature sensor 62 may be mounted on the exhaust pipe 20 between the exhaust flow changer 95 and the SCR catalyst 50.

A second temperature sensor 64 is mounted on the exhaust pipe 20 at the downstream of the SCR catalyst 50, detects the temperature of the exhaust gas at the downstream of the SCR catalyst 50, and transmits a signal corresponding thereto to the controller 90. As shown in FIG. 1, the second temperature sensor 64 may be positioned at a junction point of the exhaust pipe 20 connecting the exhaust flow changer 95 with the CUC 60, and the exhaust pipe 20 connecting the SCR catalyst 50 with the CUC 60, but is not limited thereto.

Figure 9:
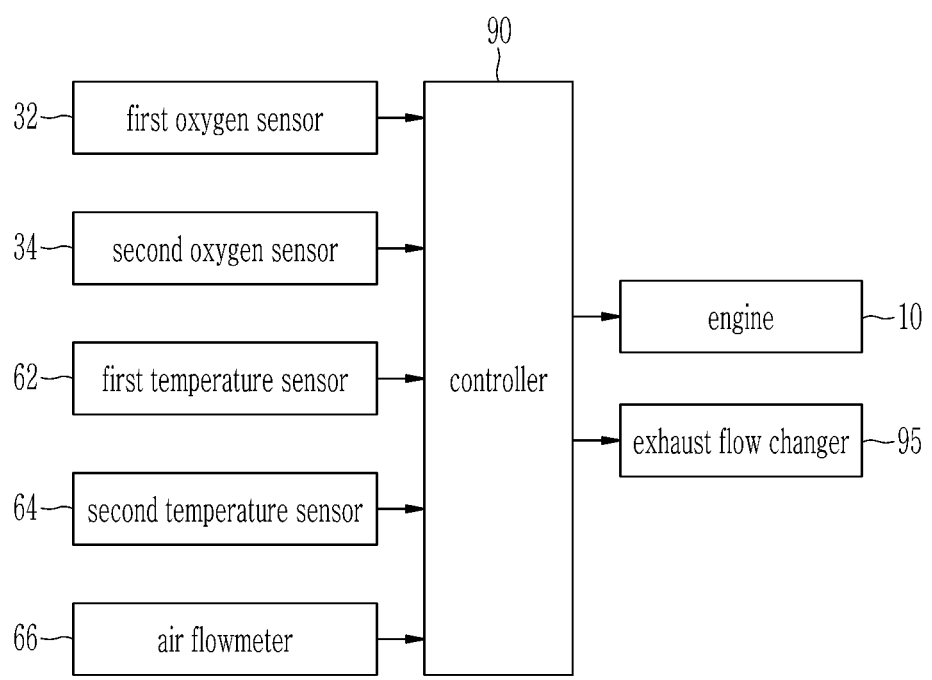
FIG. 9 is a block diagram of an after treatment system for a lean-burn engine according to an aspect of the present disclosure.

In addition to the sensors 32, 34, 62, and 64 described herein, the after treatment system may further include various sensors. For example, additional temperature sensors can be mounted on the exhaust pipe 20 at the upstream and the downstream of the ammonia production catalyst module 30 to detect the temperature of the exhaust gas at the upstream and the downstream of the ammonia production catalyst module 30, respectively. In addition, as shown in FIG. 9, the after treatment system may further include an air flowmeter 66. Further, the after treatment system may further include a NOx sensor, an HC sensor or a CO sensor mounted on the exhaust pipe 20, and concentration of emission contained in the exhaust gas can be detected via these sensors.

The controller 90 is electrically connected to the sensors 32, 34, 62, 64 and 66 to receive the signals corresponding to the detected values by the sensors 32, 34, 62, 64 and 66, and determines driving condition of the vehicle, the AFR, and the temperatures of the catalysts 30, 50, and 60 based on the signals. The controller 90 can control ignition timing, fuel injection timing, fuel amount, etc., by controlling the engine 10 based on the determination results. The controller 90 may be implemented with at least one processor executed by a predetermined program and the predetermined program may be programmed to perform each step of an after treatment method according to an aspect of the present disclosure.

Figure 4:
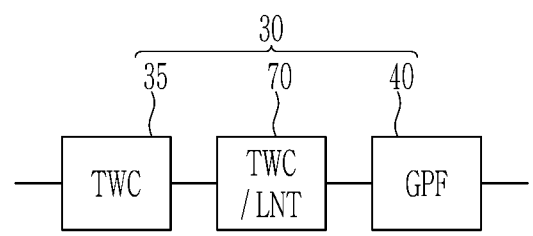
FIG. 4 is a schematic diagram of an ammonia production catalyst module according to another aspect of the present disclosure.

FIG. 4 is a schematic diagram of an ammonia production catalyst module according to another aspect of the present disclosure. The ammonia production catalyst module 30 shown in FIG. 4 is a modification of the ammonia production catalyst module 30 shown in FIG. 1.

As shown in FIG. 4, the ammonia production catalyst module 30 according to another aspect of the present disclosure sequentially includes the TWC 35, an additional TWC 70, and a particulate filter 40. Since the TWC 35 is described above, detailed description thereof will be omitted.

The additional TWC 70 is disposed on the exhaust pipe 20 between the TWC 35 and the particulate filter 40. The additional TWC 70 basically performs the same function as the TWC 35. In other words, the additional TWC 70 converts harmful materials including the CO, the HC, and the NOx contained in the exhaust gas into harmless components by oxidation-reaction reaction. In addition, the additional TWC 70 increases the amount of $NH_3$ supplied to the SCR catalyst 50 by reducing the NOx contained in the exhaust gas into $NH_3$ when the AFR is rich. In addition, a lean NOx trap (LNT) catalyst may be further coated in the additional TWC 70 and the TWC 35. The LNT catalyst absorbs the NOx at the lean AFR, and releases the absorbed NOx and reduces the released NOx into the $N_2$ gas or the $NH_3$ at the rich AFR. Thus, the LNT catalyst assists the TWC having low NOx purification performance at the lean AFR. The LNT catalyst includes at least one or a combination of an alkali metal including K, Na, Li, and Cs, an alkaline earth metal including Ba and Ca, a rare earth metal including Ir and La, and a noble metal including Pt, Pd, and Rh.

The particulate filter 40 is mounted on the exhaust pipe 20 downstream of the additional TWC 70, traps the particulate matter contained in the exhaust gas, and burns the trapped particulate matter. The particulate filter 40 is provided with inlet cells and outlet cells alternately disposed in a housing, and a wall is disposed between the inlet cell and the outlet cell. The inlet cell has an end that is opened and the other end that is blocked, and the outlet cell has an end that is blocked and the other end that is opened. The exhaust gas flows into the particulate filter 40 through the opened end of the inlet cell, flows to the outlet cell through the wall, and flows out to an outside of the particulate filter 40 through the opened end of the outlet cell. When the exhaust gas passes through the wall, the particulate filter contained in the exhaust gas does not pass through the wall and remains in the inlet cell.

Figure 5:
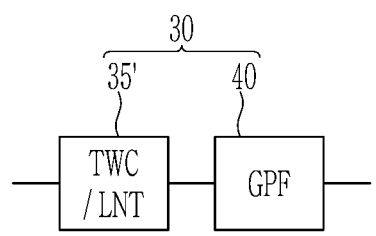
FIG. 5 is a schematic diagram of an ammonia production catalyst module according to another aspect of the present disclosure.

FIG. 5 is a schematic diagram of an ammonia production catalyst module according to another aspect of the present disclosure. The ammonia production catalyst module 30 shown in FIG. 5 is a modification of the ammonia production catalyst module 30 shown in FIG. 1.

As shown in FIG. 5, the ammonia production catalyst module 30 according to another aspect of the present disclosure sequentially includes a TWC 35' coated with the LNT catalyst and a particulate filter 40. Since the TWC 35' coated with the LNT catalyst and the particulate filter 40 are described above, detailed description thereof will be omitted.

Figure 6:
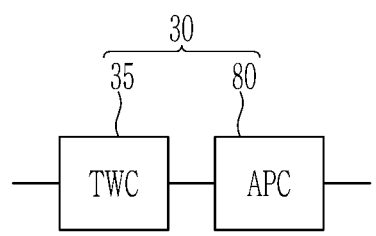
FIG. 6 is a schematic diagram of an ammonia production catalyst module according to another aspect of the present disclosure.

FIG. 6 is a schematic diagram of an ammonia production catalyst module according to another aspect of the present disclosure. The ammonia production catalyst module 30 shown in FIG. 6 is a modification of the ammonia production catalyst module 30 shown in FIG. 1.

As shown in FIG. 6, the ammonia production catalyst module 30 according to another aspect of the present disclosure sequentially includes the TWC 35 and an ammonia production catalyst (APU) 80. Since the TWC 35 is described above, detailed description thereof will be omitted.

The APC 80 is disposed at the exhaust pipe 20 at the downstream of the TWC 35. The APC 80 stores the NOx contained in the exhaust gas at the lean AFR, and generates $H_2$ to release the stored NOx and generates $NH_3$ using the released NOx and the generated $H_2$.

In one aspect, the APC 80 includes 0.4-0.9 wt % of Pt, 0.057-0.3 wt % of Pd, 0.03-0.1 wt % of Rh, 5.0-15.0 wt % of Ba, 10-30 wt % of $CeO_2$, 48.7-84.513 wt % of a composite of MgO and $Al_2O_3$, and 0-5 wt % of an additive based on a total weight of the APC 80.

In another aspect, the APC 80 includes 0.4-0.9 wt % of Pt, 0.057-0.3 wt % of Pd, 0.03-0.1 wt % of Rh, 5.0-15.0 wt % of Ba, 10-25 wt % of $CeO_2$, 48.7-79.513 wt % of the composite of MgO and $Al_2O_3$, and 0-10 wt % of the additive based on the total weight of the APC 80.

The additive is added for the performance improvement of $CeO_2$ and $Al_2O_3$ and includes at least one of La, Zr, Mg and Pr.

The Pt contained in the APC 80 functions to oxidize the NOx for the APC 80 to store the NOx. In addition, the Pt increases an amount of $H_2$ generated in the APC 80.

The Pd contained in the APC 80 improves heat resistance of the APC 80. Since the APC 80 is disposed close to the engine 10, a temperature of the APC 80 can rise to 950° C. Therefore, the Pd is added in the APC 80 to improve heat resistance.

In order to increase the $NH_3$ generation and the $H_2$ generation, a weight ratio of the Pt to the Pd in the APC 80 may be 3:1-7:1. The weight ratio of the Pt to the Pd in the APC 80 may be 3:1-5:1.

The Rh contained in the APC 80 purifies the NOx contained in the exhaust gas at a stoichiometric AFR.

The Ba and the $CeO_2$ contained in the APC 80 is configured to store the NOx in nitrate form.

In addition, the $CeO_2$ increases $H_2$ generation. However, if the APC 80 contains large amounts of the $CeO_2$, the generated $NH_3$ can be reoxidized. Thus, the APC 80 may include 10-30 wt % of $CeO_2$ based on a total weight of the APC 80.

The composite of MgO and $Al_2O_3$ contained in the APC 80 functions as a substrate. The composite of MgO and $Al_2O_3$ may include 15-25 wt % of MgO based on a total weight of the composite of MgO and $Al_2O_3$. The MgO enhances thermal stability of the Ba.

Figure 7:
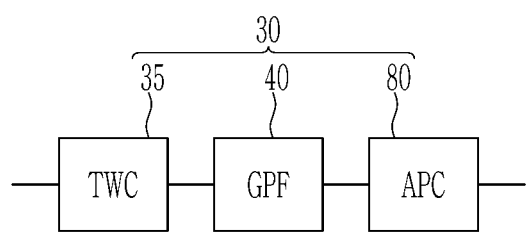
FIG. 7 is a schematic diagram of an ammonia production catalyst module according to another aspect of the present disclosure.

FIG. 7 is a schematic diagram of an ammonia production catalyst module according to another aspect of the present disclosure. The ammonia production catalyst module 30 shown in FIG. 7 is a modification of the ammonia production catalyst module 30 shown in FIG. 6.

As shown in FIG. 7, the ammonia production catalyst module 30 according to another aspect of the present disclosure sequentially includes the TWC 35, the particulate filter 40, and the APC 80. Since the TWC 35, the particulate filter 40, and the APC 80 are described above, detailed description thereof will be omitted.

Figure 8:
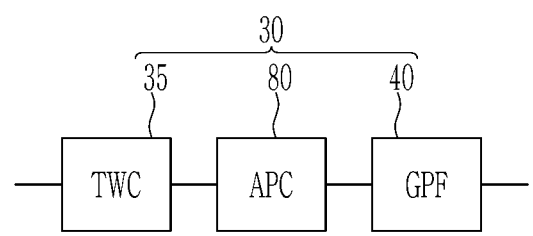
FIG. 8 is a schematic diagram of an ammonia production catalyst module according to another aspect of the present disclosure.

FIG. 8 is a schematic diagram of an ammonia production catalyst module according to another aspect of the present disclosure. The ammonia production catalyst module 30 shown in FIG. 8 is a modification of the ammonia production catalyst module 30 shown in FIG. 6.

As shown in FIG. 8, the ammonia production catalyst module 30 according to another aspect of the present disclosure sequentially includes the TWC 35, the APC 80, and the particulate filter 40. Since the TWC 30, the APC 80, and the particulate filter 40 are described above, detailed description thereof will be omitted.

According to the aspects of the present disclosure, catalysts capable of generating the $NH_3$ at the rich AFR (e.g., the TWC, the additional TWC, the LNT, the APC, etc.) are disposed at a front end portion of the after treatment system, the SCR catalyst capable of storing the $NH_3$ and purifying the NOx using the stored $NH_3$ is disposed at a middle portion of the after treatment system, and the CUC is disposed at a rear end portion of the after treatment system. Therefore, purifying performance of the emissions contained in the exhaust gas may be improved.

In this specification, the catalysts capable of purifying the emissions in the exhaust gas and generating the $NH_3$ using the NOx contained in the exhaust gas or stored therein at the rich AFR (in particular, the catalysts disposed at the upstream of the SCR catalyst) will be referred to as the ammonia production catalyst module. That is, the ammonia production catalyst module may include at least one of the TWC, the APC, the additional TWC, and the LNT catalyst. In addition, the ammonia production catalyst module contains an oxygen storage material having oxygen storage capacity (OSC). Further, the ammonia production catalyst module may include the particulate filter.

FIG. 9 is a block diagram of an after treatment system for a lean-burn engine according to an aspect of the present disclosure.

FIG. 9 illustrates a simple example of inputs and outputs of the controller 90 to implement the after treatment system according to aspects of the present disclosure. It should be understood that the inputs and the outputs of the controller 90 according to aspects of the present disclosure are not limited to the example illustrated in FIG. 9.

As shown in FIG. 9, the controller 90 is electrically connected to the first and second oxygen sensors 32 and 34, the first and second temperature sensors 62 and a 64, and the air flowmeter 66, and receives the signals corresponding to the values detected by the sensors 32, 34, 62, 64 and 66.

The first oxygen sensor 32 detects the concentration of the 02 contained in the exhaust gas at the upstream of the ammonia production catalyst module 30 and transmits the signal corresponding thereto to the controller 90. The second oxygen sensor 34 detects the concentration of the 02 contained in the exhaust gas at the downstream of the ammonia production catalyst module 30 and transmits the signal corresponding thereto to the controller 90. The controller 90 can determine whether the ammonia production catalyst module 30 is operating normally based on the signals of the first and second oxygen sensors 32 and 34, and performs the AFR control of the engine 10.

The first temperature sensor 62 detects the temperature of the exhaust gas at the upstream of the SCR catalyst 50 and transmits the signal corresponding thereto to the controller 90. The second temperature sensor 64 detects the temperature of the exhaust gas at the downstream of the SCR catalyst 50 and transmits the signal corresponding thereto to the controller 90. The controller 90 can calculate the temperatures of the ammonia production catalyst module 30, the SCR catalyst 50, and the CUC 60 based on the signals of the first and second temperature sensors 62 and 64.

The air flowmeter 66 is mounted on an intake pipe or an intake duct to detect the amount of the air flowing into the intake system, and transmits the signal corresponding thereto to the controller 90.

The controller 90 controls operation of the engine 10 and the exhaust flow changer 95 based on the values detected by the sensors 32, 34, 62, 64, and 66. That is, the controller 90 can adjust the fuel injection amount to adjust the target AFR, and can delay the ignition timing for warming up the catalysts 30, 50 and 60. In addition, the controller 90, in response to detecting that $NH_3$ generation is desired, controls a rich duration and a target rich AFR such that the NH3 stored in the SCR catalyst 50 becomes a target $NH_3$ amount. The target $NH_3$ amount can be controlled according to the temperature and a temperature change rate of the SCR catalyst 50. In addition, the controller 90 can operates the exhaust flow changer 95 at the normal mode or the bypass mode according to the temperature of the SCR catalyst 50.

Figure 10:
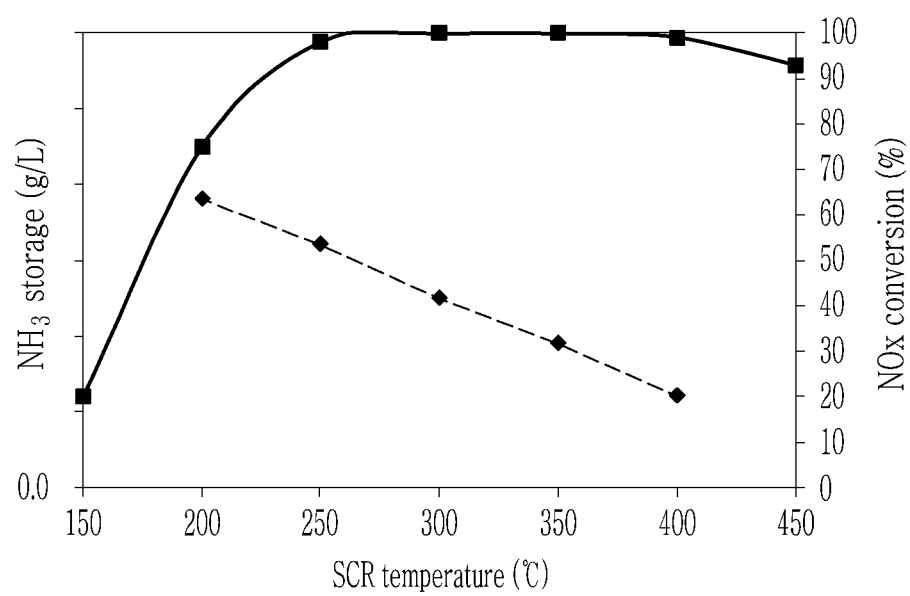
FIG. 10 is a graph showing $NH_3$ amount stored in an SCR catalyst and NOx purification efficiency of the SCR catalyst according to a temperature of the SCR catalyst.

FIG. 10 is a graph showing $NH_3$ amount stored in an SCR catalyst and NOx purification efficiency of the SCR catalyst according to a temperature of the SCR catalyst.

In FIG. 10, a solid line represents the NOx purification efficiency of the SCR catalyst 50, and a dotted line represents $NH_3$ amount stored in the SCR catalyst 50.

As shown in FIG. 10, when the temperature of the SCR catalyst 50 is 200° C., a maximum amount of the $NH_3$ is stored in the SCR catalyst 50, and as the temperature of the SCR catalyst 50 is increased, the $NH_3$ amount stored in the SCR catalyst 50 is reduced.

However, the NOx purification efficiency of the SCR catalyst 50 is close to 100% at the temperature of the SCR catalyst 50 of 250° C. to 400° C.

If the temperature of the SCR catalyst 50 is lower than 250° C., the $NH_3$ amount stored in the SCR catalyst 50 is great but the NOx purification efficiency of the SCR catalyst 50 is low. Therefore, the SCR catalyst 50 does not efficiently purify the NOx in the exhaust gas.

If the temperature of the SCR catalyst 50 is higher than 400° C., the NOx purification efficiency of the SCR catalyst 50 is high but the $NH_3$ amount stored in the SCR catalyst 50 is small. Therefore, the SCR catalyst 50 does not efficiently purify the NOx in the exhaust gas. In this case, even if the $NH_3$ is generated in the ammonia production catalyst module 30, the $NH_3$ is not stored in the SCR catalyst 50 but is slipped from the SCR catalyst 50. Thus, the exhaust gas is not supplied to the SCR catalyst 50 and is directly supplied to the CUC 60 if the engine 10 is operated at the stoichiometric AFR and the temperature of the SCR catalyst 50 is higher than a first predetermined temperature (e.g., 350° C.) according to the aspects of the present disclosure.

An after treatment method according to an aspect of the present disclosure will hereinafter be described in detail.

FIGS. 11 to 14 are flowcharts of an after treatment method according to an aspect of the present disclosure.

Figure 11:
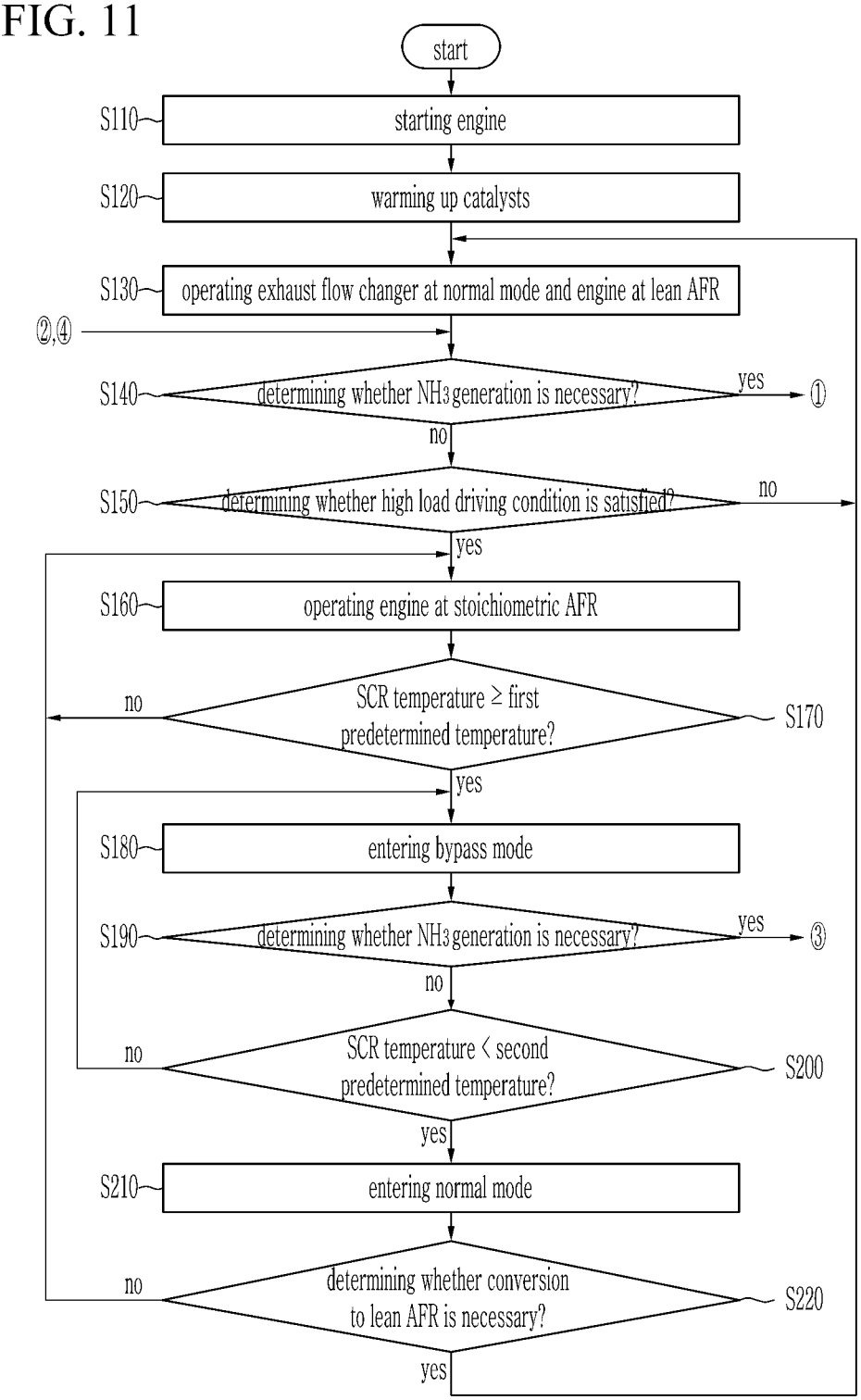
FIGS. 11 to 14 are flowcharts of an after treatment method according to an aspect of the present disclosure.

As shown in FIG. 11, when the engine 10 is started at step S110, the controller 90 calculates the temperatures of the catalysts 30, 50 and 60. In order to carry out the after treatment method according to the aspect of the present disclosure, the catalysts 30, 50 and 60 must be activated. Accordingly, the controller 90 warms up the catalysts 30, 50 and 60 at step S120 if the catalysts 30, 50 and 60 are not activated. That is, the ignition timing is delayed or the amount of the fuel injection is increased to increase the temperature of the exhaust gas.

When warming-up of the catalysts 30, 50, and 60 is completed, the controller 90 operates the exhaust flow changer 95 at the normal mode and operates the engine 10 at the lean AFR at step S130. Therefore, the ammonia production catalyst module 30 purifies the CO and the HC contained in the exhaust gas. In addition, the exhaust gas passing through the ammonia production catalyst module 30 is sent to the SCR catalyst 50, and the NOx contained in the exhaust gas is reduced using the $NH_3$ stored in the SCR catalyst 50. The exhaust gas flowing out from the SCR catalyst 50 is sent to the CUC 60 and the CO contained in the exhaust gas is removed in the CUC 60.

After that, the controller 90 determines whether the $NH_3$ generation by the ammonia production catalyst module 30 is desired at step S140.

In order to determine whether the $NH_3$ generation is desired, the controller 90 calculates the amount of the $NH_3$ stored in the SCR catalyst 50. That is, the amount of the $NH_3$ stored in the SCR catalyst 50 is calculated based on operation history of the engine 10, temperature history of the SCR catalyst 50, and the like.

After that, the controller 90 determines whether the $NH_3$ generation is desired, that is, conversion to the rich AFR is desired based on the amount of the $NH_3$ stored in the SCR catalyst 50.

In one aspect, in order to determine whether the conversion to the rich AFR is desired, the controller 90 calculates the amount of the NOx to be flowed into the SCR catalyst 50. The amount of the NOx generated in the engine 10 is calculated based on a combustion state (e.g., a combustion temperature, a combustion pressure, the air amount, the fuel amount, etc.) of the engine 10, and the amount of the NOx slipped from the ammonia production catalyst module 30 is calculated based on the AFR of the exhaust gas, the temperature of the ammonia production catalyst module 30, etc.

Thereafter, the controller 90 determines whether the SCR catalyst 50 can purify the NOx. That is, it is determined whether the amount of the $NH_3$ stored in the SCR catalyst 50 is sufficient to purify the NOx flowing into the SCR catalyst 50. For example, if the amount of the $NH_3$ stored in the SCR catalyst 50 is greater than or equal to an amount of the $NH_3$ required to purify the NOx to be flowed into the SCR catalyst 50, the controller 90 determines that the SCR catalyst 50 can purify the NOx. On the contrary, if the amount of the $NH_3$ stored in the SCR catalyst 50 is less than the amount of the $NH_3$ required to purify the NOx to be flowed into the SCR catalyst 50, the controller 90 determines that the conversion to the rich AFR is desired, that is the $NH_3$ generation is desired.

In another aspect, in order to determine whether the conversion to the rich AFR is desired, the controller 90 determines whether the amount of the $NH_3$ stored in the SCR catalyst 50 is greater than or equal to a lower threshold of the $NH_3$. For example, if the amount of the $NH_3$ stored in the SCR catalyst 50 is greater than or equal to the lower threshold of the $NH_3$, the controller 90 determines that the conversion to the rich AFR is not desired. On the contrary, if the amount of the $NH_3$ stored in the SCR catalyst 50 is less than the lower threshold of the $NH_3$, the controller 90 determines that the conversion to the rich AFR is desired, that is the $NH_3$ generation is desired.

If it is determined at the step S140 that the $NH_3$ generation is not desired, the controller 90 determines whether a high load driving condition is satisfied at step S150. The high load driving condition can be set in advance according to intention of an engine designer. For example, if a current driving condition could use an output of the engine 10 beyond a predetermined engine output, the high load driving condition may be satisfied.

If the high load driving condition is not satisfied at the step S150, the controller 90 returns to the step S130 to continuously operate the exhaust flow changer 95 at the normal mode and the engine 10 at the lean AFR.

If the high load driving condition is satisfied at the step S150, the controller 10 operates the engine 10 at the stoichiometric AFR (λ=1) at step S160. In this case, the exhaust flow changer 95 is also operated at the normal mode. In this case, the temperature of the exhaust gas discharged from the ammonia production catalyst module 30 rises.

At this state, the controller 90 calculates or detects the temperature of the SCR catalyst 50. For example, the controller 90 detects/calculates the temperature of the SCR catalyst 50 based on the detected values of the first and second temperature sensors 62 and 64. Thereafter, the controller 90 determines whether the temperature of the SCR catalyst 50 is higher than or equal to the first predetermined temperature at step S170. The first predetermined temperature is predetermined to allow the exhaust gas from the ammonia production catalyst module 30 to bypass the SCR catalyst 50 and may be arbitrarily set by a person skilled in the art according to design intention. In one aspect, the first predetermined temperature may be a value between 330° C. and 360° C. In another aspect, the first predetermined temperature may be 350° C.

If the temperature of the SCR catalyst 50 is lower than the first predetermined temperature at the step S170, the controller 90 returns to the step S160 and continues to operate the engine 10 at the stoichiometric AFR.

If the temperature of the SCR catalyst 50 is higher than or equal to the first predetermined temperature at the step S170, the controller 90 operates the exhaust flow changer 95 at the bypass mode at step S180. Accordingly, the exhaust gas discharged from the ammonia production catalyst module 30 bypasses the SCR catalyst 50 and is sent directly to the CUC 60. In this case, the temperature of the SCR catalyst 50 is lowered and the temperature of the CUC 60 rises. If the temperature of the CUC 60 rises, the OSC contained in the CUC 60 is increased, and CO purifying capacity at the rich AFR is increased. Further, if the exhaust flow changer 95 is operated at the bypass mode, the exhaust gas bypasses the SCR catalyst 50 so that the NOx contained in the exhaust gas cannot be purified and can be discharged to the exterior of the vehicle. Therefore, if the exhaust flow changer 95 is operated at the bypass mode, the engine 10 is prohibited to be operated at the lean AFR.

Thereafter, the controller 90 determines whether the $NH_3$ generation by the ammonia generation catalyst module 30 is desired at step S190. As described above, the controller 90 determines whether the $NH_3$ generation is desired, that is whether the conversion to the rich AFR is desired, based on the $NH_3$ stored in the SCR catalyst 50.

If it is determined at the step S190 that the $NH_3$ generation is not desired, the controller 90 determines whether the temperature of the SCR catalyst 50 is lower than a second predetermined temperature at step S200. The second predetermined temperature is a temperature at which the $NH_3$ is not released from the SCR catalyst 50 even if the exhaust flow changer 95 is operated at the normal mode, and can be arbitrarily set by a person skilled in the art according to the design intention. In one aspect, the second predetermined temperature may a value be between 330° C. and 360° C. In another aspect, the second predetermined temperature may be 350° C. Considering the design intention, the second predetermined temperature may be lower than or equal to the first predetermined temperature.

If the temperature of the SCR catalyst 50 is higher than or equal to the second predetermined temperature at the step S200, the controller 90 returns to the step S180 to continuously operate the exhaust flow changer 95 at the bypass mode. Therefore, the exhaust gas discharged from the ammonia production catalyst module 30 is directly supplied to the CUC 60.

If the temperature of the SCR catalyst 50 is lower than the second predetermined temperature at the step S200, the controller 90 operates the exhaust flow changer 95 at the normal mode at step S210. Therefore, the exhaust gas discharged from the ammonia production catalyst module 30 is sequentially sent to the SCR catalyst 50 and the CUC 60.

Thereafter, the controller 90 determines whether conversion to the lean AFR is necessary or desired at step S220. For example, if the high load driving condition is not satisfied, the controller 90 can determine that the conversion to the lean AFR is desired. Whether or not the conversion to the lean AFR is desired can be set by a person skilled in the art according to the design intention.

If it is determined at the step S220 that the conversion to the lean AFR is not desired, the controller 90 returns to the step S160 to continuously operate the engine 10 at the stoichiometric AFR.

If it is determined at the step S220 that the conversion to the lean AFR is desired, the controller 90 returns to the step S130 to continuously operate the engine 10 at the lean AFR.

Figure 12:
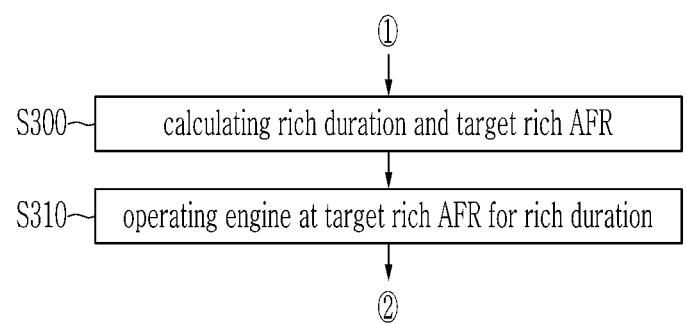

Meanwhile, in one aspect, it is determined at the step S140 that $NH_3$ generation is desired, the controller 90, as shown in FIG. 12, calculates the rich duration and the target rich AFR for generating the $NH_3$ at step S300. The rich duration and the target rich AFR are calculated such that the $NH_3$ amount stored in the SCR catalyst 50 becomes the target $NH_3$ amount. That is, if the engine 10 is operated at the target rich AFR for the rich duration, the target $NH_3$ amount is stored in the SCR catalyst 50.

The target rich AFR may be 0.97 that is slightly rich AFR, but is not limited thereto. In addition, the rich duration can be calculated according to the target rich AFR and the temperature of the CUC 60. CO purification capacity of the CUC 60 varies with the temperature of the CUC 60. In order to reduce the CO discharged to the exterior of the vehicle, the rich duration may be calculated according to the CO purification capacity of the CUC 60. That is, the rich duration can be calculated according to the target rich AFR and the temperature of the CUC 60.

If the rich duration and the target rich AFR are calculated at the step S300, the controller 90 operates the engine 10 at the target rich AFR for the rich duration at step S310. That is, the target $NH_3$ amount is stored in the SCR catalyst 50 by operating the engine 10 at the target rich AFR for the rich duration.

After that, the controller 90 returns to the step S140 to determine whether the $NH_3$ generation is necessary or desired.

Figure 13:
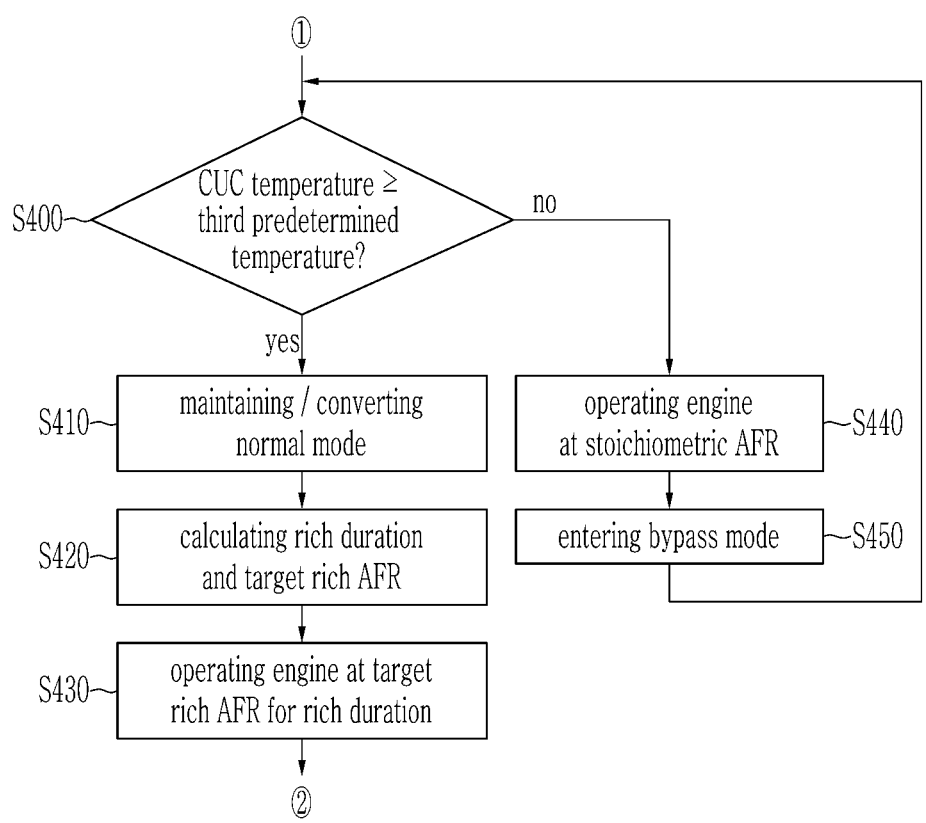

In another aspect, if it is determined at the step S140 that the $NH_3$ generation is desired, the controller 90, as shown in FIG. 13, determines whether the temperature of the CUC 60 is higher than or equal to a third predetermined temperature at step S400. As described above, the higher the temperature of the CUC 60 is, the more the CO contained in the exhaust gas can be purified at the rich AFR. Therefore, if the temperature of the CUC 60 is lower than the third predetermined temperature, it is desired to warm up the CUC 60. Here, the third predetermined temperature is a temperature at which the CUC 60 can sufficiently remove the CO contained in the exhaust gas, and can be set by a person skilled in the art according to the design intention. In one aspect, the third predetermined temperature may be 220° C. or higher and 250° C. or lower. In another aspect, the third predetermined temperature may be 230° C.

If the temperature of the CUC 60 is lower than the third predetermined temperature at the step S400, the controller 90 operates the engine 10 at the stoichiometric AFR to rise the temperature of the CUC 60 at step S440, and operates the exhaust flow changer 95 at the bypass mode at step S450.

If the temperature of the CUC 60 is higher than or equal to the third predetermined temperature at the step S400, the controller 90 converts the operation of the exhaust flow changer 95 to the normal mode or continues to operate the exhaust flow changer 95 at the normal mode at step S410.

After that, the controller 90 calculates the rich duration and the target rich AFR for generating the $NH_3$ at step S420. The rich duration and the target rich AFR are calculated such that the $NH_3$ amount stored in the SCR catalyst 50 becomes the target $NH_3$ amount. That is, if the engine 10 is operated at the target rich AFR for the rich duration, the target $NH_3$ amount is stored in the SCR catalyst 50.

If the rich duration and the target rich AFR are calculated at the step S420, the controller 90 operates the engine 10 at the target rich AFR for the rich duration at step S430. That is, the target NH$_3$ amount is stored in the SCR catalyst 50 by operating the engine 10 at the target rich AFR for the rich duration.

After that, the controller 90 returns to the step S140 to determine whether the NH$_3$ generation is desired.

Figure 14:
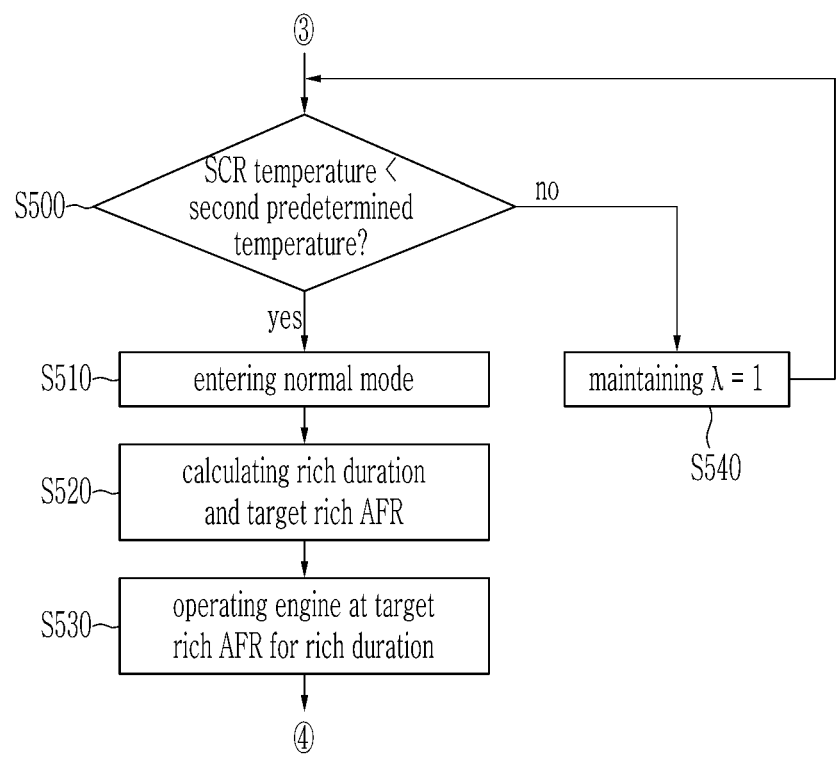

On the other hand, if it is determined at the step S190 that the NH$_3$ generation is desired, the controller 90, as shown in FIG. 14, determines whether the temperature of the SCR catalyst 50 is lower than the second predetermined temperature at step S500.

If the temperature of the SCR catalyst 50 is higher than or equal to the second predetermined temperature at the step S500, the NH$_3$ cannot be stored in the SCR catalyst 50 and can be slipped from the SCR catalyst 50 even if the NH$_3$ is generated in the ammonia production catalyst module 30. In this case, the controller 90 operates the engine 10 at the stoichiometric AFR at step S540, so that the NOx contained in the exhaust gas is reduced in the ammonia production catalyst module 30. Further, in order to inhibit or prevent the temperature rise of the SCR catalyst 50, the exhaust flow changer 95 is continuously operated at the bypass mode.

If the temperature of the SCR catalyst 50 is lower than the second predetermined temperature at the step S500, the controller 90 operates the exhaust flow changer 95 at the normal mode at step S510. Accordingly, the exhaust gas discharged from the ammonia production catalyst module 30 is sequentially sent to the SCR catalyst 50 and the CUC 60.

Thereafter, the controller 90 calculates the rich duration and the target rich AFR at step S520, and operates the engine 10 at the target rich AFR for the rich duration at step S530.

(Test Method 1)

The ammonia production catalyst module 30, the SCR catalyst 50, and the CUC 60 are sequentially disposed on the exhaust pipe 20. After that, 2.0 L, 4-cylinders, lean-burn gasoline engine is connected to the exhaust pipe 20 and aging treatment is performed. The aging treatment is carried out at 1,000° C. on the ammonia production catalyst module (particularly, the TWC 35) basis for 50 hours.

After the aging process, the engine 10 is operated at the lean AFR and the exhaust flow changer 95 is operated at the normal mode at an engine speed of 2,000 rpm and a brake mean effective pressure (BMEP) of 3 bar to increase the temperature of the SCR catalyst 50 to 260° C. Thereafter, the engine 10 is operated at the stoichiometric AFR for 120 seconds at the engine speed of 2,000 rpm and the BMEP of 8 bar. At this time, if the temperature of the SCR catalyst 50 reaches 350° C., the exhaust flow changer 95 is operated at the bypass mode in Example 1, while the exhaust flow changer 95 is continuously operated at the normal mode in Comparative Example 1.

After the operation of the exhaust flow rate changer 95 is converted to the normal mode and the engine 10 is operated at the rich AFR for 15 seconds, the engine 10 is operated at the lean AFR for 120 seconds at the engine speed of 2,000 rpm and the BMEP of 3 bar, and the exhaust flow changer 95 is operated at the normal mode.

FIG. 15 is a graph showing a temperature of an SCR catalyst if an exhaust gas bypasses the SCR catalyst and if the exhaust gas does not bypass the SCR catalyst when an engine is operated under a predetermined driving condition.

In FIG. 15, a solid line represents the temperature of the SCR catalyst 50 in Comparative Example 1, and a dotted line represents the temperature of the SCR catalyst 50 in Example 1.

As shown in FIG. 15, the temperature of the SCR catalyst 50 is maintained at 400° C. in Example 1, while the temperature of the SCR catalyst 50 rises to 440° C. in Comparative Example 1. That is, regardless of the temperature of the SCR catalyst 50, if the exhaust flow changer 95 is continuously operated at the normal mode (see Comparative Example 1), a large amount of the NH$_3$ can be slipped from the SCR catalyst 50.

(Test Method 2)

The ammonia production catalyst module 30, the SCR catalyst 50, and the CUC 60 are sequentially disposed on the exhaust pipe 20. After that, 2.0 L, 4-cylinders, lean-burn gasoline engine is connected to the exhaust pipe 20 and aging treatment is performed. The aging treatment is carried out at 1,000° C. on the ammonia production catalyst module (particularly, the TWC 35) basis for 50 hours.

After the aging process, the engine 10 is operated at the lean AFR and the exhaust flow changer 95 is operated at the normal mode at the engine speed of 2,000 rpm and the BMEP of 3 bar to increase the temperature of the CUC 60 to 230° C. Thereafter, the engine 10 is operated at the stoichiometric AFR for 120 seconds at the engine speed of 2,000 rpm and the BMEP of 8 bar. At this time, the exhaust flow changer 95 is operated at the normal mode for 30 seconds and is operated at the bypass mode for 90 seconds. During the exhaust flow changer 95 is operated at the bypass mode, the exhaust gas discharged from the ammonia production catalyst module 30 is sent to the CUC 60 in Example 1, while the exhaust gas discharged from the ammonia production catalyst module 30 is not sent to both the SCR catalyst 50 and the CUC 60 in Comparative Example 2.

After the operation of the exhaust flow rate changer 95 is converted to the normal mode and the engine 10 is operated at the rich AFR for 15 seconds, the engine 10 is operated at the lean AFR for 120 seconds at the engine speed of 2,000 rpm and the BMEP of 3 bar, and the exhaust flow changer 95 is operated at the normal mode.

FIG. 16 is a graph showing a temperature of a CUC if an exhaust gas bypasses the CUC and if the exhaust gas does not bypass the CUC when an engine is operated under a predetermined driving condition.

In FIG. 16, a solid line represents the temperature of the CUC 60 in Comparative Example 2, and a dotted line represents the temperature of the CUC 60 in Example 1.

As shown in FIG. 16, during the exhaust flow changer 95 operates at the bypass mode, the temperature of the CUC 60 rises above 300° C. in Example 1, while the temperature of the CUC 60 falls to 210° C. in Comparative Example 2. As mentioned above, the CO purification capacity of the CUC 60 increases with increasing temperature of the CUC 60 at the rich AFR. In the purification aspect of the CO contained in the exhaust gas, it is advantageous to supply the exhaust gas discharged from the ammonia production catalyst module 30 to the CUC 60 during the exhaust flow changer 95 is operated at the bypass mode.

While this disclosure has been described in connection with what is presently considered to be practical aspects, it is to be understood that the disclosure is not limited to the disclosed aspects. On the contrary, it is intended to cover various modifications and equivalent arrangements included within the spirit and scope of the appended claims.

What is claimed is:

1. An after treatment system for a lean-burn engine, comprising:
   an exhaust pipe connected to the lean-burn engine and through which an exhaust gas generated in the lean-burn engine flows;
   an ammonia production catalyst module mounted on the exhaust pipe, capable of purifying emission contained in the exhaust gas, and generating ammonia (NH$_3$)

using nitrogen oxide (NOx) contained in the exhaust gas or NOx stored therein at a rich air/fuel ratio (AFR);

a selective catalytic reduction (SCR) catalyst mounted on the exhaust pipe downstream of the ammonia production catalyst module, storing the $NH_3$ generated in the ammonia production catalyst module, and reducing the NOx contained in the exhaust gas using the stored $NH_3$;

a CO clean-up catalyst (CUC) mounted on the exhaust pipe downstream of the SCR catalyst and purifying CO contained in the exhaust gas; and an exhaust flow changer mounted on the exhaust pipe between the ammonia production catalyst module and the SCR catalyst, and controlling a flow of the exhaust gas such that the exhaust gas passing through the ammonia production catalyst module flows to one of the SCR catalyst and the CUC, wherein the exhaust gas passing through the SCR catalyst is continuously supplied to the CUC.

2. The after treatment system of claim 1, further comprising a controller detecting information on the AFR of the exhaust gas, a temperature of the SCR catalyst, and a temperature of the CUC, and controlling the AFR of the exhaust gas and operation of the exhaust flow changer based on the information on the AFR of the exhaust gas, the temperature of the SCR catalyst, and the temperature of the CUC, wherein the operation of the exhaust flow changer includes a normal mode at which the exhaust gas passing through the ammonia production catalyst module flows to the SCR catalyst, and a bypass mode at which the exhaust gas passing through the ammonia production catalyst module flows to the CUC.

3. The after treatment system of claim 2, wherein the controller operates the exhaust flow changer at the bypass mode if the temperature of the SCR catalyst is higher than or equal to a first predetermined temperature in a state that the exhaust flow changer is operated at the normal mode and the engine is operated at a stoichiometric AFR.

4. The after treatment system of claim 3, wherein the controller operates the exhaust flow changer at the normal mode if the temperature of the SCR catalyst is lower than a second predetermined temperature in a state that the exhaust flow changer is operated at the bypass mode and the engine is operated at the stoichiometric AFR, and wherein the second predetermined temperature is lower than or equal to the first predetermined temperature.

5. The after treatment system of claim 2, wherein the controller calculates a rich duration and a target rich AFR and operates the engine at the target rich AFR for the rich duration if $NH_3$ generation is desired in a state that the engine is operated at a lean AFR and the exhaust flow changer is operated at the normal mode.

6. The after treatment system of claim 5, wherein the controller operates the engine at a stoichiometric AFR and operates the exhaust flow changer at the bypass mode until the temperature of the CUC is higher than or equal to a third predetermined temperature if the $NH_3$ generation is desired in a state that the engine is operated at the lean AFR and the exhaust flow changer is operated at the normal mode.

7. The after treatment system of claim 4, wherein the controller converts the operation of the exhaust flow changer to the normal mode, calculates a rich duration and a target rich AFR, and operates the engine at the target rich AFR for the rich duration if $NH_3$ generation is desired in a state that the engine is operated at a stoichiometric AFR and the exhaust flow changer is operated at the bypass mode.

8. The after treatment system of claim 7, wherein the controller operates the engine at the stoichiometric AFR until the temperature of the SCR catalyst is lower than the second predetermined temperature if the $NH_3$ generation is desired in a state that the engine is operated at the stoichiometric AFR and the exhaust flow changer is operated at the bypass mode.

9. The after treatment system of claim 1, wherein the ammonia production catalyst module includes at least one of a three-way catalyst (TWC), an ammonia production catalyst (APC), an additional TWC, and a lean NOx trap catalyst.

10. The after treatment system of claim 9, wherein the ammonia production catalyst module further includes a particulate filter trapping particulate matter in the exhaust gas.

11. An after treatment method for controlling an after treatment system sequentially equipped with an ammonia production catalyst module, a selective catalytic reduction (SCR) catalyst, and a CO clean-up catalyst (CUC) on an exhaust pipe through which an exhaust gas flows and which is connected to a lean-burn engine, wherein the after treatment system further includes an exhaust flow changer disposed between the ammonia production catalyst module and the SCR catalyst and controlling a flow of the exhaust gas such that the exhaust gas passing through the ammonia production catalyst module flows to one of the SCR catalyst and the CUC, wherein the exhaust gas passing through the SCR catalyst is continuously supplied to the CUC, and wherein operation of the exhaust flow changer includes a normal mode at which the exhaust gas passing through the ammonia production catalyst module flows to the SCR catalyst, and a bypass mode at which the exhaust gas passing through the ammonia production catalyst module flows to the CUC, the after treatment method comprising:

determining whether a temperature of the SCR catalyst is higher than or equal to a first predetermined temperature during operating the engine at a stoichiometric AFR; and converting the operation of the exhaust flow changer into the bypass mode if the temperature of the SCR catalyst is higher than or equal to the first predetermined temperature.

12. The after treatment method of claim 11, further comprising:

determining whether the temperature of the SCR catalyst is lower than a second predetermined temperature during the engine is operated at the stoichiometric AFR and the exhaust flow changer is operated at the bypass mode; and converting the operation of the exhaust flow changer into the normal mode if the temperature of the SCR catalyst is lower than the second predetermined temperature, wherein the second predetermined temperature is lower than or equal to the first predetermined temperature.

13. The after treatment method of claim 11, further comprising:

determining whether $NH_3$ generation is desired during the engine is operated at a lean AFR and the exhaust flow changer is operated at the normal mode;

calculating a rich duration and a target rich AFR if the $NH_3$ generation is desired; and operating the engine at the target rich AFR for the rich duration.

14. The after treatment method of claim 13, further comprising:
- determining, before calculating the rich duration and the target rich AFR, whether a temperature of the CUC is lower than a third predetermined temperature;
- operating the engine at the stoichiometric AFR if the temperature of the CUC is lower than the third predetermined temperature; and
- converting the operation of the exhaust flow changer into the bypass mode.

15. The after treatment method of claim 14, further comprising maintaining or converting the operation of the exhaust flow changer into the normal mode if the temperature of the CUC is higher than or equal to the third predetermined temperature.

16. The after treatment method of claim 11, further comprising:
- determining whether $NH_3$ generation is desired during the engine is operated at the stoichiometric AFR and the exhaust flow changer is operated at the bypass mode;
- determining whether the temperature of the SCR catalyst is lower than a second predetermined temperature if the $NH_3$ generation is desired;
- converting the operation of the exhaust flow changer into the normal mode if the temperature of the SCR catalyst is lower than the second predetermined temperature;
- calculating a rich duration and a target rich AFR; and
- operating the engine at the target rich AFR for the rich duration.

17. The after treatment method of claim 16, further comprising operating the engine continuously at the stoichiometric AFR if the temperature of the SCR catalyst is higher than or equal to the second predetermined temperature.

18. The after treatment method of claim 11, wherein operating the engine at a lean AFR is prohibited if the exhaust flow changer is operated at the bypass mode.

19. The after treatment method of claim 13, wherein the rich duration is calculated according to the target rich AFR and a temperature of the CUC.

20. The after treatment method of claim 16, wherein the rich duration is calculated according to the target rich AFR and a temperature of the CUC.

* * * * *